United States Patent
Green et al.

(10) Patent No.: US 11,130,570 B2
(45) Date of Patent: Sep. 28, 2021

(54) METHOD AND SYSTEM FOR DELIVERING GOODS AND RETRIEVING REUSABLE TOTES FOR DRONE DELIVERY

(71) Applicant: INTERNATIONAL BUSINESS MACHINES CORPORATION, Armonk, NY (US)

(72) Inventors: William J. Green, Cary, NC (US); Sharon T. Spaulding, Highland, NY (US); Marc Henri Coq, Hopewell Junction, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 399 days.

(21) Appl. No.: 16/203,969

(22) Filed: Nov. 29, 2018

(65) Prior Publication Data
US 2020/0172241 A1 Jun. 4, 2020

(51) Int. Cl.
*B64C 39/02* (2006.01)
(52) U.S. Cl.
CPC ...... *B64C 39/024* (2013.01); *B64C 2201/027* (2013.01); *B64C 2201/042* (2013.01); *B64C 2201/108* (2013.01); *B64C 2201/128* (2013.01); *B64C 2201/146* (2013.01)
(58) Field of Classification Search
CPC ........ B64C 2201/027; B64C 2201/042; B64C 2201/108; B64C 2201/128; B64C 2201/146; B64C 39/024; B64C 2201/08; B65D 21/00; B65D 21/064; B64D 1/22; F16M 11/18; Y02W 30/50
See application file for complete search history.

(56) References Cited

U.S. PATENT DOCUMENTS 3,759,563 A * 9/1973 Kitamura ................. B25J 9/148
                                                 294/198
3,904,156 A * 9/1975 Smith .................... B66C 13/06
                                                 244/118.1

(Continued)

FOREIGN PATENT DOCUMENTS

WO    2018085136 A1    5/2018
WO    2018089236 A1    5/2018

OTHER PUBLICATIONS

U.S. Appl. No. 16/203,958, filed Nov. 29, 2018.
List of IBM Patents or Patent Applications Treated As Related—Date Filed: Nov. 29, 2018, 2 pages.

*Primary Examiner* — Medhat Badawi
(74) *Attorney, Agent, or Firm* — Cantor Colburn LLP; Tihon Poltavets (57) ABSTRACT

A delivery system includes a drone including a prime mover, one or more rotors operatively connected to the prime mover, and a payload attachment system including a latch mechanism having a first selectively deployable clamp member and a second selectively deployable clamp member. The delivery system also includes a plurality of nested reusable totes. Each of the plurality of nested reusable totes includes a body having a base, sides, and a lid, at least two of the sides include a gripping feature. The selectively deployable clamp members are operable to engage with the gripping feature on one or more of the plurality of nested reusable totes.

19 Claims, 5 Drawing Sheets

(56) References Cited

U.S. PATENT DOCUMENTS

| | | | | |
|---|---|---|---|---|
| 4,763,833 A * | 8/1988 | Stoll | ............... | B65D 5/2047 |
| | | | | 217/125 |
| 4,943,099 A * | 7/1990 | Gabriel | ............... | B66C 1/34 |
| | | | | 294/110.1 |
| 4,981,163 A * | 1/1991 | Westlund | ............... | A01G 23/083 |
| | | | | 144/24.13 |
| 5,540,536 A * | 7/1996 | Hoedl | ............... | B65D 21/00 |
| | | | | 414/416.09 |
| 5,613,722 A * | 3/1997 | Fandrich | ............... | B66C 1/585 |
| | | | | 294/110.1 |
| 5,826,825 A * | 10/1998 | Gabriel | ............... | B64D 1/22 |
| | | | | 244/137.1 |
| 6,123,376 A * | 9/2000 | Yakushinji | ............... | B66C 1/422 |
| | | | | 294/110.1 |
| 7,934,758 B2 * | 5/2011 | Stamey | ............... | E02F 3/3663 |
| | | | | 294/106 |
| 8,650,847 B2 * | 2/2014 | Snell | ............... | A01D 46/26 |
| | | | | 56/340.1 |
| 8,807,614 B2 * | 8/2014 | Xu | ............... | A01G 23/0955 |
| | | | | 294/201 |
| 9,174,733 B1 * | 11/2015 | Burgess | ............... | B64D 1/12 |
| 9,302,770 B2 | 4/2016 | Burgess et al. | | |
| 9,321,531 B1 * | 4/2016 | Takayama | ............... | B64C 39/024 |
| 9,493,238 B2 | 11/2016 | Takayama et al. | | |
| 9,580,173 B1 * | 2/2017 | Burgess | ............... | B64D 1/22 |
| 9,630,715 B2 | 4/2017 | Takayama et al. | | |
| 9,650,136 B1 * | 5/2017 | Haskin | ............... | B64C 39/024 |
| 9,764,836 B1 * | 9/2017 | Elzinga | ............... | B64C 39/024 |
| 9,783,295 B2 | 10/2017 | Takayama et al. | | |
| 9,840,339 B1 * | 12/2017 | O'Brien | ............... | B64D 47/02 |
| 9,975,651 B1 * | 5/2018 | Eck | ............... | B65G 67/04 |
| 10,239,638 B1 * | 3/2019 | Cohen | ............... | B64F 1/222 |
| 10,338,609 B2 * | 7/2019 | Obaidi | ............... | G08G 5/045 |
| 10,472,065 B2 * | 11/2019 | Winfree | ............... | B64D 1/22 |
| 10,479,503 B2 * | 11/2019 | Sikora | ............... | B64D 1/22 |
| 10,507,920 B2 * | 12/2019 | Waltner | ............... | F16F 15/027 |
| 10,689,107 B2 * | 6/2020 | Baracaldo Angel | ............... | F16M 13/027 |
| 2002/0178074 A1 * | 11/2002 | Bloom | ............... | G06Q 10/08 |
| | | | | 705/26.81 |
| 2007/0221721 A1 * | 9/2007 | Bradford | ............... | B65D 21/0213 |
| | | | | 229/199 |
| 2011/0320376 A1 * | 12/2011 | Dearlove | ............... | G06Q 10/08 |
| | | | | 705/337 |
| 2013/0146556 A1 * | 6/2013 | Cameron | ............... | B66C 23/28 |
| | | | | 212/276 |
| 2013/0299046 A1 * | 11/2013 | Helenius | ............... | A01G 3/08 |
| | | | | 144/343 |
| 2014/0032034 A1 * | 1/2014 | Raptopoulos | ............... | G05D 1/0088 |
| | | | | 701/25 |
| 2015/0151837 A1 * | 6/2015 | Sane | ............... | B64D 1/12 |
| | | | | 701/3 |
| 2015/0158599 A1 * | 6/2015 | Sisko | ............... | B64F 1/20 |
| | | | | 244/114 R |
| 2015/0175276 A1 * | 6/2015 | Koster | ............... | B64C 39/024 |
| | | | | 244/114 R |
| 2016/0059963 A1 | 3/2016 | Burgess et al. | | |
| 2016/0196756 A1 * | 7/2016 | Prakash | ............... | G08G 5/025 |
| | | | | 701/3 |
| 2016/0236778 A1 | 8/2016 | Takayama et al. | | |
| 2017/0043871 A1 | 2/2017 | Takayama et al. | | |
| 2017/0106978 A1 * | 4/2017 | Sopper | ............... | B65D 5/4208 |
| 2017/0253334 A1 | 9/2017 | Takayama et al. | | |
| 2017/0267348 A1 * | 9/2017 | Sweeny | ............... | A47J 47/14 |
| 2017/0334561 A1 * | 11/2017 | Sopper | ............... | B64D 1/22 |
| 2017/0361928 A1 * | 12/2017 | Matsuda | ............... | B64C 39/024 |
| 2018/0072419 A1 * | 3/2018 | Burgess | ............... | B64C 39/024 |
| 2019/0315512 A1 * | 10/2019 | Smith | ............... | B65D 5/2038 |

* cited by examiner

METHOD AND SYSTEM FOR DELIVERING GOODS AND RETRIEVING REUSABLE TOTES FOR DRONE DELIVERY

BACKGROUND

The present invention relates to the art of delivery systems, and more specifically, to method and system for delivering goods and retrieving reusable totes.

Over the years, various systems have been developed to deliver goods to consumers. Systems have included vehicles that have ranged from cars, trucks, vans, trains, planes, and the like. Currently, merchants and other sources of goods are exploring drone technology for delivering goods to consumers. A drone may be configured to transport a good to, for example, a home, or a shared drop off spot. The use of drones could alleviate traffic on surface streets and, by using electrical energy, could also lead to a reduction in pollution.

SUMMARY

According to an aspect of an exemplary embodiment of the present invention, a delivery system includes a drone including a prime mover, one or more rotors operatively connected to the prime mover, and a payload attachment system including a latch mechanism having a first selectively deployable clamp member and a second selectively deployable clamp member. The delivery system also includes a plurality of nested reusable totes. Each of the plurality of nested reusable totes includes a body having a base, sides, and a lid, at least two of the sides include a gripping feature. The selectively deployable clamp members are operable to engage with the gripping feature on one or more of the plurality of nested reusable totes.

According to another aspect of an exemplary embodiment, a drone for retrieving nested reusable totes includes a prime mover, one or more rotors operatively connected to the prime mover, and a payload attachment system including a latch mechanism having a first selectively deployable clamp member and a second selectively deployable clamp member.

According to yet another aspect of an exemplary embodiment, a method of delivering goods includes closing a first selectively deployable clamp member and a second selectively deployable clamp member supported on a drone onto one or more reusable totes, transporting the one or more reusable totes to a selected destination with the drone, and releasing the first and second selectively deployable clamp members to leave the one or more totes at the selected destination.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
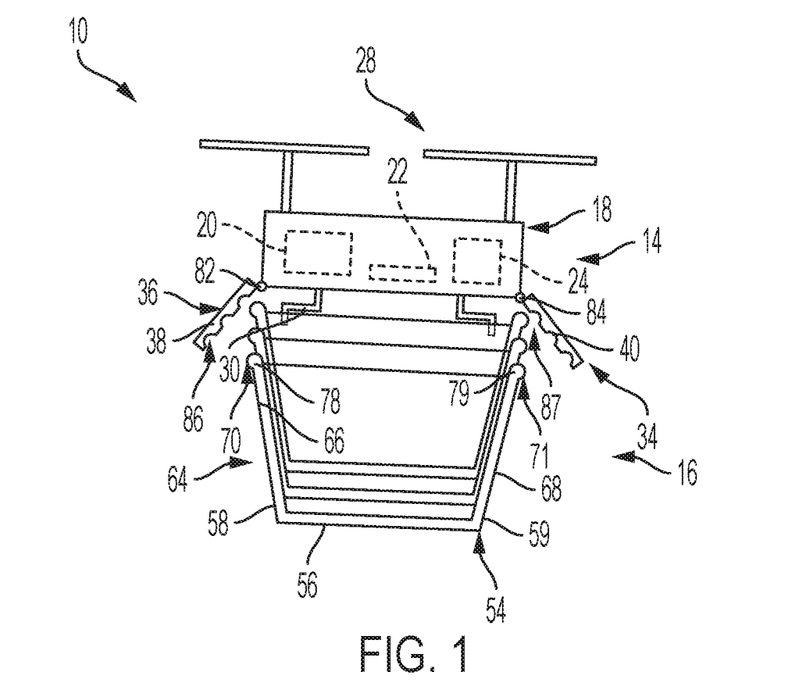
FIG. 1 depicts a system for delivering goods illustrating a drone having a latch mechanism approaching a reusable tote, in accordance with an aspect of an exemplary embodiment.

With initial reference to FIG. 1, a system for delivering goods and retrieving reusable totes is generally indicated at 10. System 10 includes a drone 14 that may support, deliver, and retrieve a reusable tote(s) indicated at 16. Drone 14 includes a drone body 18 that supports a prime mover 20. Drone body 18 may also support a navigation system 22 that may include a GPS (not separately labeled) and a control system 24. Prime mover 20 is connected to one or more rotors 28 that, when operated, provide lift to drone 14. Drone 14 also includes support members, one of which is indicated at 30. The number, configuration, and arrangement of support members 30 may vary.

Figure 2:
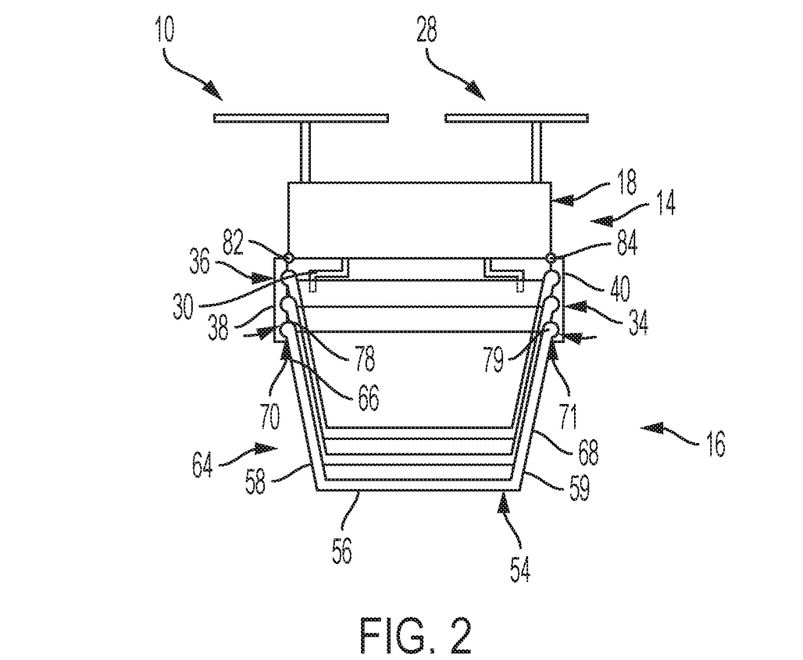
FIG. 2 depicts the system of FIG. 1 illustrating the latch mechanism connecting with the reusable tote, in accordance with an aspect of an exemplary embodiment.

In an embodiment, drone 14 includes a payload attachment system 34 having a latch mechanism 36 that can grip and release reusable totes 16. Latch mechanism 36 includes a first selectively deployable clamp member 38 and a second selectively deployable clamp member 40. Control system 24 may selectively manipulate first and second selectively deployable clamp members 38 and 40 to close onto reusable totes 16 such as shown in FIG. 2. Drone 14 may then take flight to transport reusable totes 16 to a collection center (not shown). Of course, it should be understood, that drone 14 may also be employed to deliver totes filled with goods to consumers and/or wholesalers.

In an embodiment, each reusable tote 16 includes a tote body 54 having a base 56, a first side 58, a second side 59, a third side (not shown) and a fourth side (not separately labeled). Reusable tote 16 includes a lid 64 defined by a first lid member 66 and a second lid member 67. First and second lid members 66 and 67 may be stowed in a recess (not shown) formed in corresponding ones of first side 58 and second side 59. First lid member 66 is connected to first side 58 through a first hinge member 70 and second lid member 67 is connected to second side 59 through a second hinge member 71.

First hinge member 70 defines a first gripping feature 78 and second hinge member 71 defines a second gripping feature 79. Latching mechanism 36 selectively engages with first and second gripping features 78 and 79 as will be discussed herein. First and second gripping features 78 and 79 include a generally circular cross-section. However, it should be understood that the particular geometry of the gripping features may vary.

In an embodiment, first selectively deployable clamp member 38 is mounted to drone body 18 through a first articulating hinge 82 and second selectively deployable clamp member 40 is mounted to drone body 18 through a second articulating hinge 84. First selectively deployable clamp member 38 includes a first plurality of gripping feature receiving elements 86 and second selectively deployable clamp member 40 includes a second plurality of gripping feature receiving elements 87 that engage with corresponding ones of first and second gripping features 78 and 79 on reusable totes 16.

Figure 3:
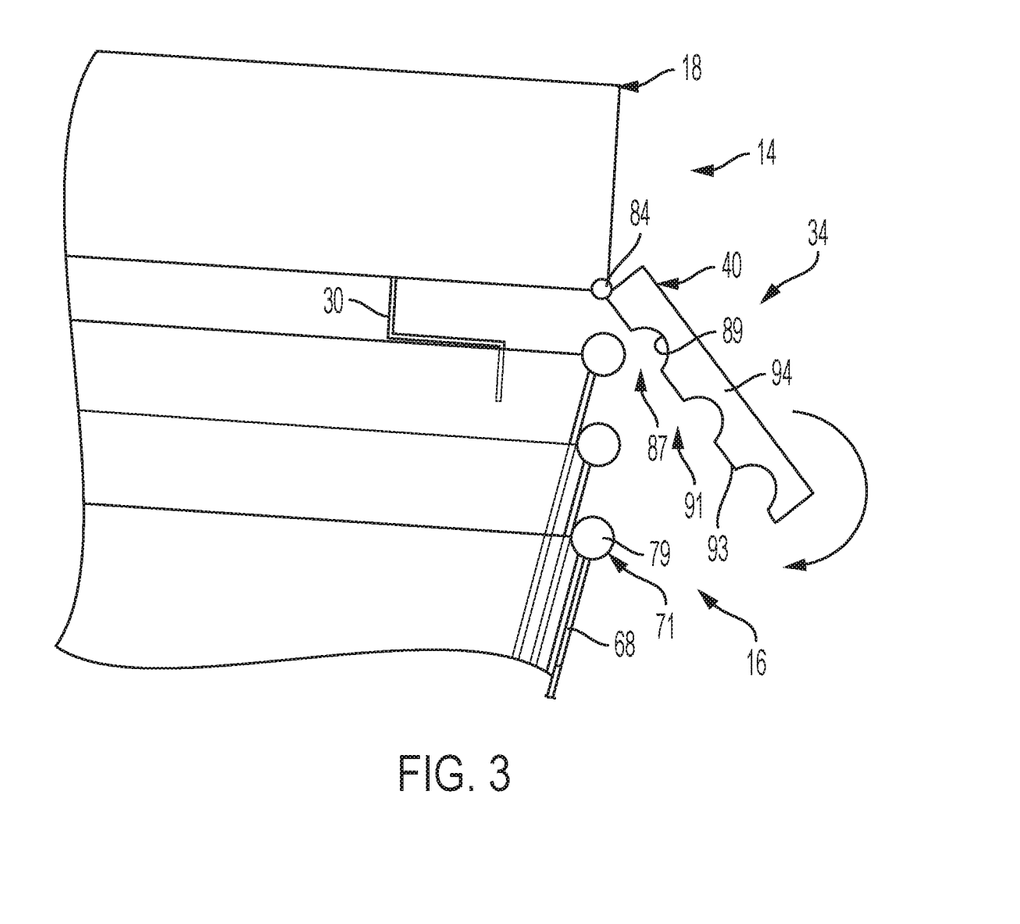
FIG. 3 depicts a portion of the latch mechanism of the drone of FIG. 1 in a non-deployed configuration, in accordance with an exemplary embodiment.
Figure 4:
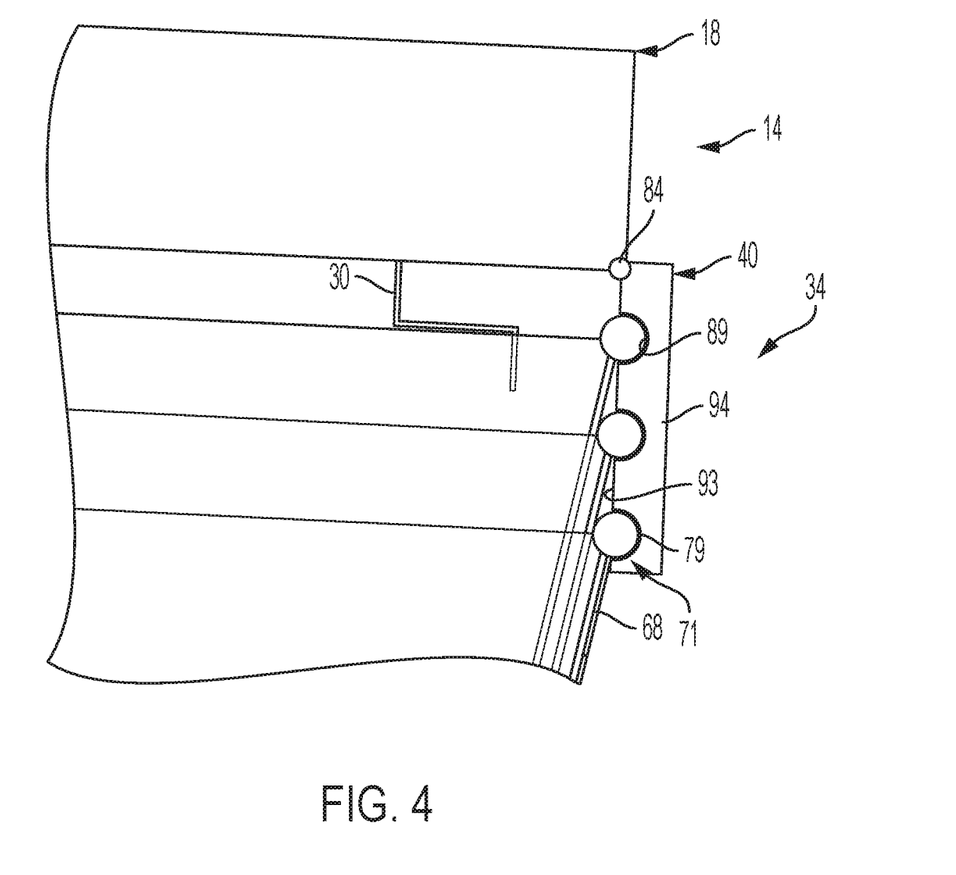
FIG. 4 depicts the portion of the latch mechanism of FIG. 3 in a deployed configuration, in accordance with an exemplary embodiment.

As best shown in FIGS. 3 and 4, each of the second plurality of gripping feature receiving elements 87 includes a generally arcuate profile 89 and are arranged in a linear array along second selectively deployable clamp member 40. At this point, it should be understood that the particular geometry of gripping feature receiving elements 87 may vary and may match a geometry of the gripping features. In the embodiment shown, second selectively deployable clamp member 40 includes a first side portion 93 and an opposing second side portion 94. Linear array 91 of gripping feature receiving elements 87 is arranged on first side portion 93. In this manner, when second selectively deployable clamp member 40 is closed by, for example, control system 24, gripping features 79 on reusable totes 16 are captured by gripping feature receiving elements 87 as shown in FIG. 4. Of course, it should be understood that first selectively deployable clamp member 38 may be similarly formed and operated (FIG. 2).

Figures 5A, 5B:
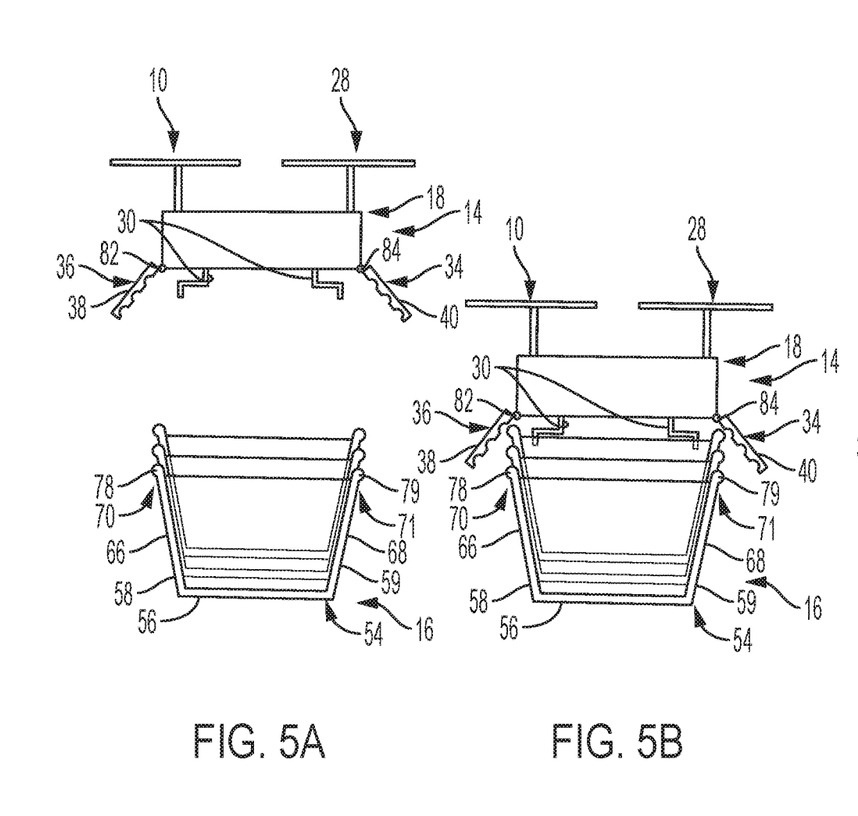
FIG. 5a depicts the drone of FIG. 1 approaching a plurality of nested reusable totes, in accordance with an exemplary embodiment.
FIG. 5b depicts the drone position over the plurality of nested reusable totes of FIG. 5a, in accordance with an exemplary embodiment.
Figure 5C:
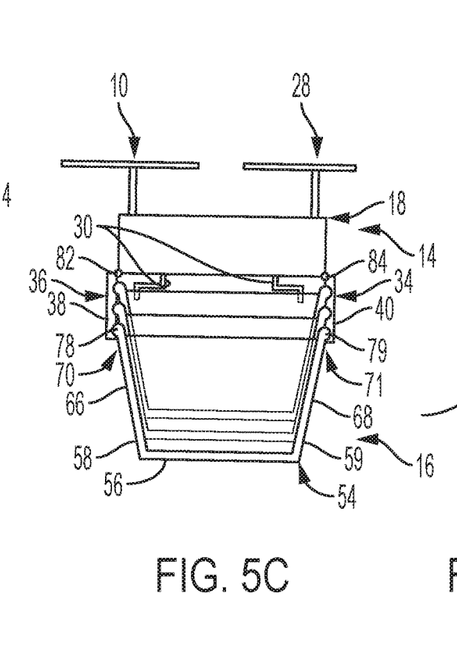
FIG. 5c depicts the drone connecting to the plurality of nested reusable totes, in accordance with an exemplary embodiment.
Figure 5D:
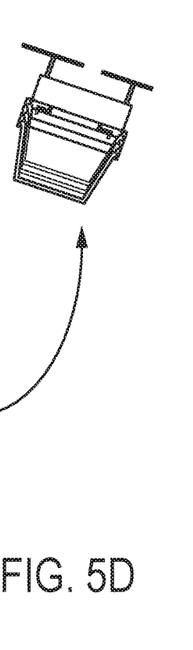
FIG. 5d depicts the drone taking flight connected to the plurality of nested reusable totes, in accordance with an exemplary embodiment.

Reference will now follow to FIGS. 5a-5d in describing a method of retrieving reusable totes, in accordance with an aspect of an exemplary embodiment. As shown in FIG. 5a, reusable totes may be arranged in a nested configuration at a collection point (not shown). Drone 14 may be navigated to the collection point by a remote operator. The remote operator may rely on navigation system 22 for coordinate/location feedback. The remote operator may also rely on a drone mounted camera (not shown) to align with nested reusable totes 14 as shown in FIG. 5b. At this point, control system 24 may receive an input from the remote operator to close latching mechanism 36 as shown in FIG. 5c. The remote operator may then take flight to return the reusable totes to a selected destination as shown in FIG. 5d.

Figure 6A:
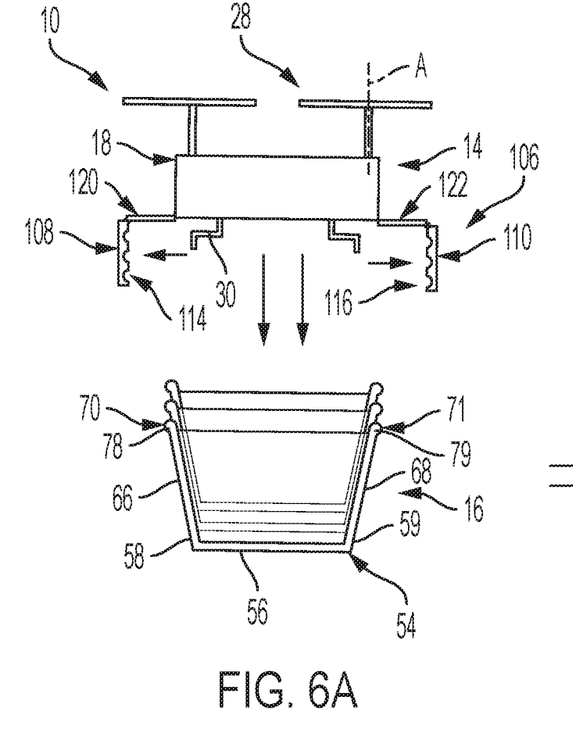
FIG. 6a depicts a drone including a latch mechanism, in accordance with another aspect of an exemplary embodiment approaching a plurality of nested reusable totes.
Figure 6B:
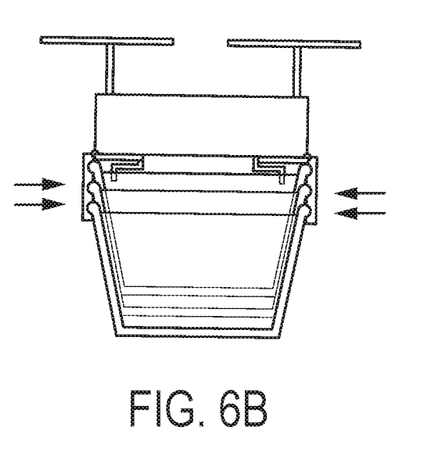
FIG. 6b depicts the latch mechanism of FIG. 6a connecting with the plurality of nested reusable totes, in accordance with an aspect of an exemplary embodiment.

Reference will now follow to FIGS. 6a and 6b, wherein like reference numbers represent corresponding parts in the respective views, in describing a latching mechanism 106 in accordance with another aspect of an exemplary embodiment. Latching mechanism 106 includes a first selectively deployable clamp member 108 and a second selectively deployable clamp member 110. First selectively deployable clamp member 108 includes a first plurality of gripping feature receivers 114 and second selectively deployable clamp member 110 includes a second plurality of gripping feature receivers 116.

First selectively deployable clamp member 108 is mounted to a first selectively extendable shaft 120 and second selectively deployable clamp member 110 is supported by a second selectively extendable shaft 122. First and second selectively extendable shafts 120 and 122 may extend and retract along an axis (not separately labeled) that is substantially perpendicular to an axis of rotation "A" of rotors 28 between a released position (FIG. 6a) and a clamped position (FIG. 6b).

Figure 7:
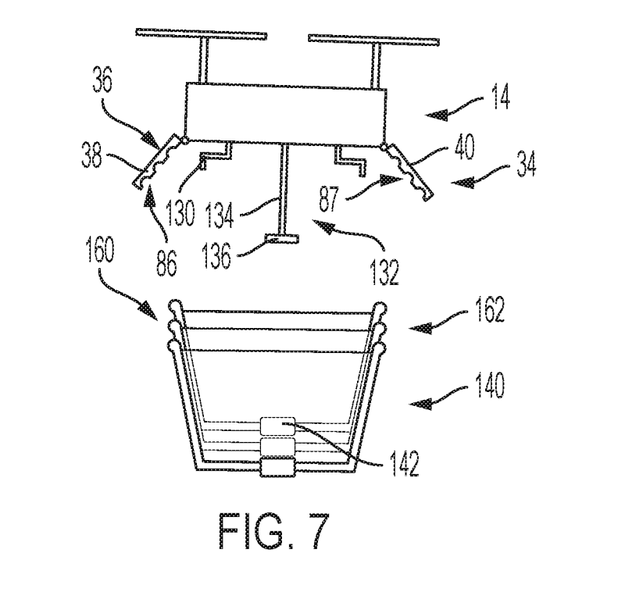
FIG. 7 depicts a drone including a selectively deployable magnet and latch mechanism, in accordance with yet another aspect of an exemplary embodiment.

In FIG. 7, wherein like reference numbers represent corresponding parts in the respective views, drone 14 includes a selectively deployable magnet system 132 that includes a selectively deployable shaft 134 supporting a magnet 136. Reusable totes 140 may each include a magnet member such as indicated at 142. Magnet member 142 may be used to connect with other reusable totes 140 and magnet 136. Magnet 136 may be deployed to connect with reusable totes 140. Selectively extendable shaft 134 may then raise reusable totes 140 where they may be secured by latching mechanism 36.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment of the invention had been described, it will be understood that those skilled in the art, both now and in the future, may make various improvements and enhancements which fall within the scope of the claims which follow. These claims should be construed to maintain the proper protection for the invention first described.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting-data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:
1. A delivery system comprising:
  a drone including a prime mover, one or more rotors operatively connected to the prime mover, and a payload attachment system including a latch mechanism having a first selectively deployable clamp member and a second selectively deployable clamp member, each of the first and second selectively deployable clamp members is moveably secured to the drone and include a plurality of gripping feature receiving elements having a selected size and shape; and a plurality of nested reusable totes, each of the plurality of nested reusable totes including a body having a base, sides, and a lid, at least two of the sides include a gripping feature having a geometry that substantially matches the selected size and shape of the gripping feature receiving elements, wherein each of the plurality of gripping feature receiving elements on each of the selectively deployable clamp members is operable to engage with the gripping feature on each of the two sides of the plurality of nested reusable totes.

2. A drone for retrieving nested reusable totes comprising:
a prime mover;
one or more rotors operatively connected to the prime mover; and
a payload attachment system including a latch mechanism having a first selectively deployable clamp member and a second selectively deployable clamp member, each of the first and second selectively deployable clamp members is moveably secured to the drone and include a plurality of gripping feature receiving elements, each of the plurality of gripping feature receiving elements having a selected size and shape and is operable to engage with a gripping element on a reusable tote having a geometry that substantially matches the selected size and shape of the gripping feature receiving elements.

3. The drone according to claim 2, wherein each of the first and second selectively deployable clamp members is mounted to the drone through an articulating hinge.

4. The drone according to claim 2, wherein each of the first and second selectively deployable clamp members is mounted to the drone through a selectively extendable shaft.

5. The drone according to claim 4, wherein the selectively extendable shaft projects outwardly of the drone along an axis that is substantially perpendicular to an axis of rotation of the one or more rotors.

6. The drone according to claim 2, wherein each of the plurality of gripping feature receiving elements includes a generally arcuate profile.

7. The drone according to claim 2, wherein the plurality of gripping feature receiving elements define a linear array of recesses formed in a single side of each of the first and second selectively deployable clamping members.

8. The drone according to claim 2, wherein the first and second selectively deployable clamp members are operable to engage with one or more gripping features of a reusable tote.

9. A method of delivering goods comprising:
shifting a first selectively deployable clamp member toward a second selectively deployable clamp member supported on a drone;
engaging a plurality of gripping feature receiving elements having a selected size and shape on each of the first and second selectively deployable clamp members with a corresponding gripping feature having a geometry that substantially matches the selected size and shape of the gripping feature receiving elements on one or more reusable totes;
transporting the one or more reusable totes to a selected destination with the drone; and
releasing the first and second selectively deployable clamp members to leave the one or more totes at the selected destination.

10. The method of claim 9, wherein closing the first and second selectively deployable clamp members includes pivoting the first and second selectively deployable clamp members about a hinge.

11. The method of claim 9, wherein closing first and second selectively deployable clamp members includes shifting the first and second selectively deployable clamp members laterally inwardly toward the drone on selectively extendable shafts.

12. The method of claim 9, wherein shifting the first and second selectively deployable clamp members includes engaging first and second gripping features on the one or more reusable totes with the plurality of gripping feature receiving elements.

13. The method of claim 12, wherein engaging the first and second gripping features includes clamping onto first and second hinges of the one or more reusable totes.

14. The method of claim 9, wherein shifting the first and second selectively deployable clamp members onto one or more reusable totes includes closing the first and second clamp members onto a plurality of reusable totes.

15. The method of claim 14, wherein shifting the first and second clamp members onto a plurality of the one or more reusable totes includes simultaneously grasping the plurality of reusable totes.

16. The method of claim 9, further comprising: directing the drone to an empty reusable tote.

17. The method of claim 16, further comprising: grabbing the empty reusable tote and directing the drone to another empty reusable tote.

18. The method of claim 17, further comprising: nesting the empty reusable tote into the another empty reusable tote.

19. The method of claim 18, further comprising: grabbing the empty reusable tote and the another empty reusable tote with the first and second clamp members and transporting the empty reusable tote and the another empty reusable tote to another location.

* * * * *